M. A. WHITTEN.
AUTOMOBILE TRUCK CHAIN.
APPLICATION FILED MAR. 31, 1920.
1,394,384.
Patented Oct. 18, 1921.
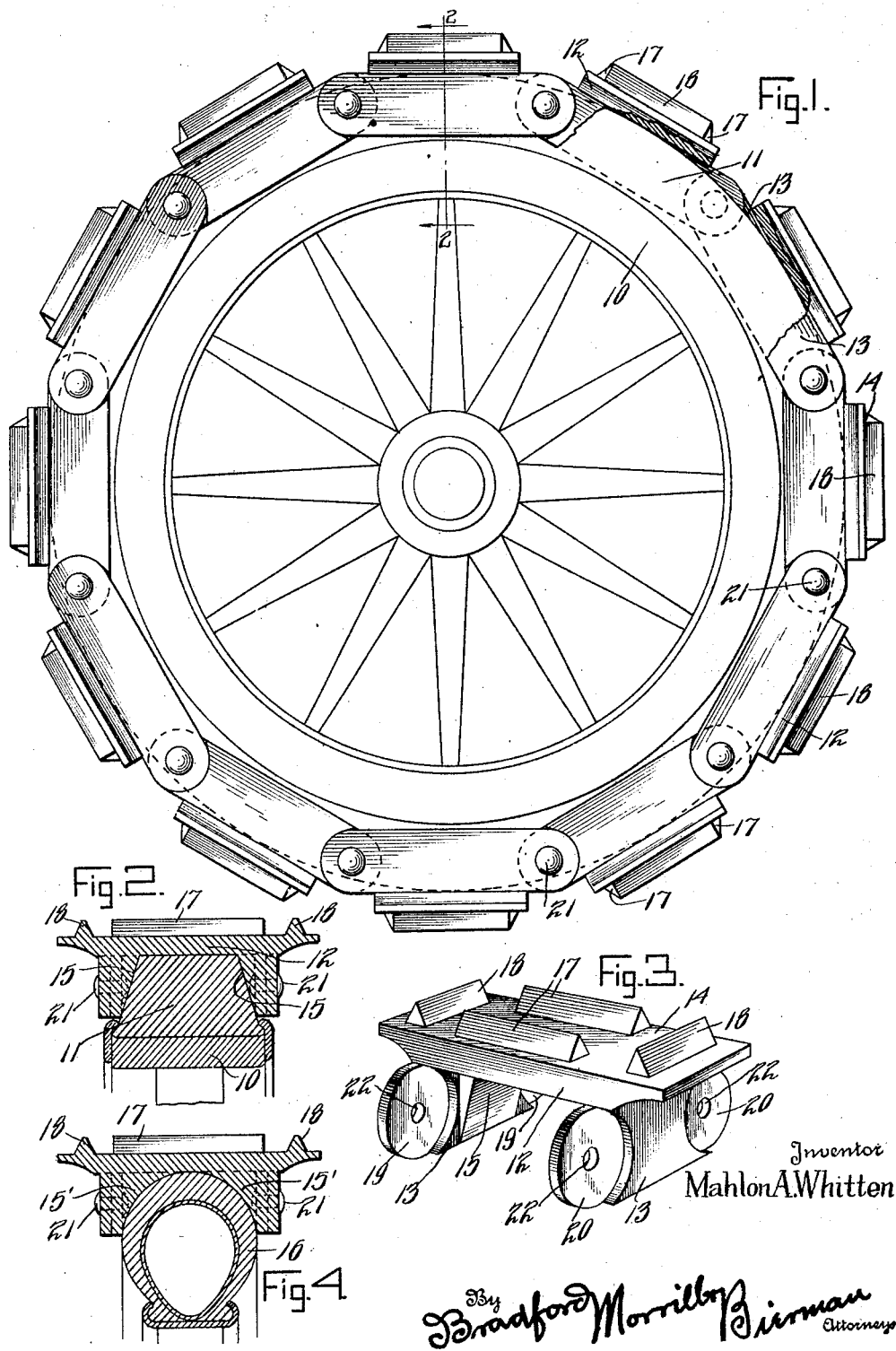

UNITED STATES PATENT OFFICE.

MAHLON A. WHITTEN, OF MARS HILL, MAINE.

AUTOMOBILE-TRUCK CHAIN.

1,394,384.  Specification of Letters Patent.  Patented Oct. 18, 1921.

Application filed March 31, 1920. Serial No. 370,420.

*To all whom it may concern:*

Be it known that I, MAHLON A. WHITTEN, a citizen of the United States, residing at Mars Hill, in the county of Aroostook and State of Maine, have invented a new and useful Automobile-Truck Chain, of which the following is a specification.

This invention relates to armored treads for vehicle wheels and has for an object to provide a flexible tread structure adapted to be secured about the tire of a wheel for the purpose of increasing traction as well as increasing the width of tread whereby greater weight is supported.

Further object of the invention is to provide an armored structure made up of identical units each having a traction surface and each jointed to the proximate unit forming a continuous series of jointed units entirely around and engaging the tire of the wheel.

With these and other objects in view the device comprises certain novel units, elements and combinations as will be hereinafter more fully described and claimed.

In the drawings,

Figure 1 is a view of the wheel in side elevation with the armor applied thereto, part of the armor being broken away to show the manner of applying to the tire.

Fig. 2 is a transverse sectional view through one of the units and the tire to which it is applied taken on line 2—2 of Fig. 1.

Fig. 3 is a perspective view of one of the units.

Fig. 4 is a transverse sectional view corresponding in plane to Fig. 2 but proportioned to operate in conjunction with a pneumatic tire as distinguished from solid or cushion tire.

Like characters of reference indicate corresponding parts throughout the several views.

The improved armor which forms the subject matter of this application will be adapted to operate upon and in conjunction with wheels provided with tires of various types. As shown at Figs. 1 and 2 the wheel 10 is provided with a solid or cushion tire 11 secured to the wheel in substantially the usual and ordinary manner. The armor is made up of a plurality of identical units, one of which is shown in perspective at 12 in Fig. 3 and in side elevation at Fig. 1. Each unit comprises side members 13 secured to a tread plate 14, preferably though not necessarily, by being formed integral therewith and spaced to correspond to the tire upon which it is to be employed. The inner surfaces of the plates 13 are provided with members 15 which engage the sides of the tire 11. The shape of these members will depend upon the shape of the tire. As shown at Fig. 2 the members are substantially wedge shape and as shown at 15' in Fig. 4 are arcuate to fit the arcuate tire 16. These members 15 and 15' will, preferably though not necessarily, be formed integral with the side members 13 and tread plate 14.

The tread plate 14 is provided with a plurality of traction increasing lugs 17 and side lugs 18 which will prevent skidding.

Each of the plates 13 of each of the units is extended to form a hinge member. As indicated at 19 the plates are depressed upon the inner surface and at 20 upon the outer surface whereby each unit is identical with each other unit and used interchangeable and reversible. The depressions 19 and 20 are substantially circular in form and substantially half the thickness of the plates 13, the members of the proximate units engaging within the said depressions with bolts 21 through openings 22 in said members.

By securing together the requisite number of such units by the use of the bolts 21 an endless flexible tread structure is produced of the circumference required to properly engage upon and grip the tire presenting in series as the wheel progresses the several individual treads 14 which, as will be noted, are much wider than the tires upon which they are employed and also by reason of the traction-increasing lugs the grip of the vehicle upon the ground is greatly increased.

Having thus fully described my said invention what I claim as new and desire to secure by Letters Patent, is:

A tread armor comprising a plurality of identical units each comprising side plates spaced to occupy opposite sides of a tire and with a connecting tread, each side plate being depressed upon the inner surface and outer surface respectively to form offset extensions, said depressions being so proportioned that they are occupied by the extensions of adjacent units and pivoted thereto to form an endless flexible tread structure having its connected side plates lying in the same plane and allowing the units to be used interchangeably or reversibly with other units.

MAHLON A. WHITTEN.